(12) United States Patent
Larsson

(10) Patent No.: US 7,506,786 B2
(45) Date of Patent: Mar. 24, 2009

(54) COUPLING DEVICE

(75) Inventor: Wilhelm Larsson, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 569 days.

(21) Appl. No.: 11/162,065

(22) Filed: Aug. 26, 2005

(65) Prior Publication Data
US 2008/0073394 A1 Mar. 27, 2008

Related U.S. Application Data

(63) Continuation of application No. PCT/SE2004/000235, filed on Feb. 23, 2004, now abandoned.

(30) Foreign Application Priority Data
Feb. 28, 2003 (SE) .................................... 0300521

(51) Int. Cl.
*B60R 9/00* (2006.01)
(52) U.S. Cl. ................. 224/325; 224/326; 224/317; 224/319; 224/324
(58) Field of Classification Search ................. 224/315, 224/325, 326, 317, 319, 324, 327, 330
See application file for complete search history.

(56) References Cited
U.S. PATENT DOCUMENTS

| | | | | |
|---|---|---|---|---|
| 4,877,169 A * | 10/1989 | Grim | .......................... | 224/331 |
| 5,102,697 A * | 4/1992 | Grunke et al. | ................ | 427/229 |
| 5,423,465 A | 6/1995 | Kauka et al. | | |
| 5,492,258 A * | 2/1996 | Brunner | ....................... | 224/321 |
| 5,730,343 A * | 3/1998 | Settelmayer | ................ | 224/321 |
| 5,782,392 A * | 7/1998 | Yamamoto | ................... | 224/326 |
| 5,845,828 A * | 12/1998 | Settelmayer | ................ | 224/321 |
| 5,873,594 A * | 2/1999 | McCoy et al. | ............ | 280/491.5 |
| 6,766,929 B2 * | 7/2004 | Karlsson | ...................... | 224/319 |
| 6,843,394 B2 * | 1/2005 | Aki | ............................ | 224/309 |

FOREIGN PATENT DOCUMENTS

| | | |
|---|---|---|
| DE | 84045256 U1 | 8/1984 |
| EP | 1008490 A1 | 6/2000 |
| EP | 1022192 A2 | 7/2000 |

* cited by examiner

*Primary Examiner*—Nathan J Newhouse
*Assistant Examiner*—Lester L Vanterpool
(74) *Attorney, Agent, or Firm*—Novak Druce + Quigg LLP

(57) ABSTRACT

Coupling device (4) for connecting a load carrier bar (3) extending laterally across a vehicle roof to a roof rail (2), which rail extends in the longitudinal direction (L) of the incorporating vehicle. The coupling device includes a base part (6) which, when the coupling device is connected to the roof rail, is securely attached to the load carrier bar, and which base part is provided with a contact surface (8) which is positioned on the roof rail, as well as a tightening arrangement (17, 23, 26, 27) connected to the base part and comprising a tightening strap (27) and a tightening device (23), the tightening strap enclosing the roof rail and being tightened by the tightening device, and n this manner a contact area (30) on the contact surface (8) is pressed against the roof rail, thus achieving secure connection of the coupling device to the roof rail, the base part (6) being of a convex arched shape (31) in the area to the front of the contact area (30), with respect to the longitudinal direction of the vehicle, when the contact surface (8) is tightened against the roof rail, and that the side of the arched shape facing the roof rail (2) is made of a ductile material.

20 Claims, 6 Drawing Sheets

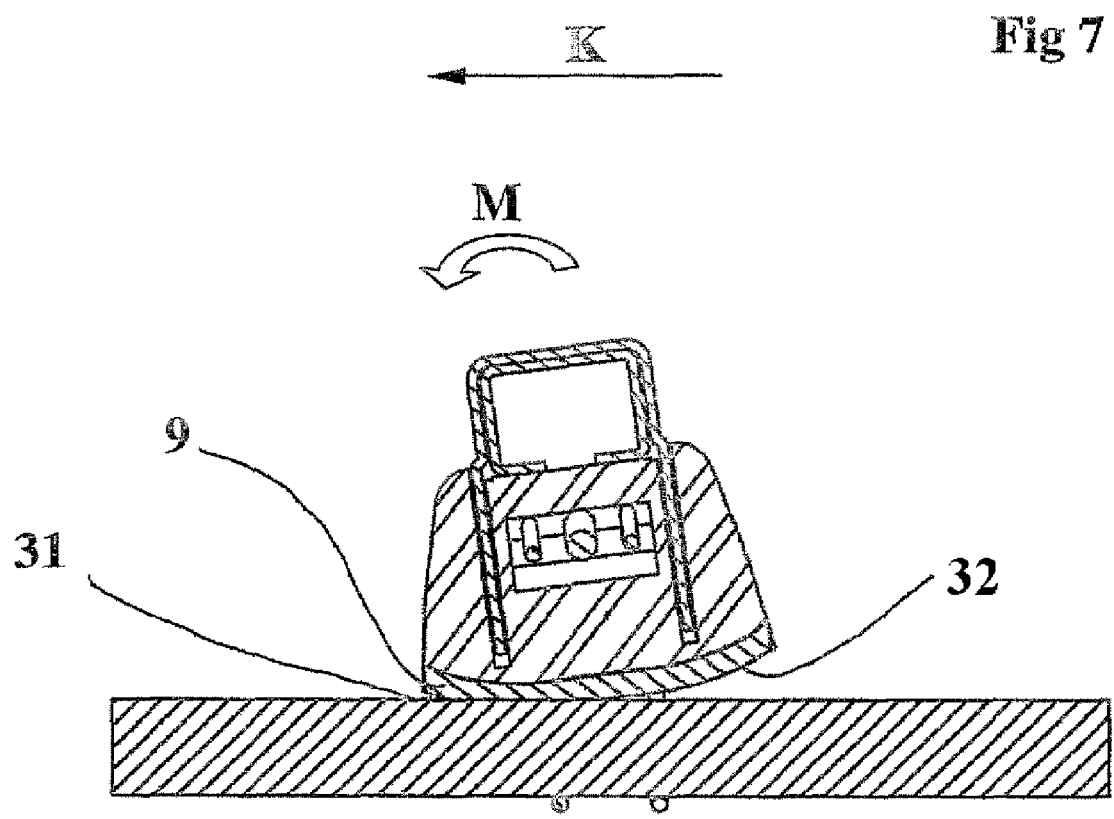

COUPLING DEVICE

CROSS-REFERENCE TO RELATED APPLICATIONS

The present application is a continuation patent application of International Application No. PCT/SE2004/000235 filed 23 Feb. 2004 now abandoned which was published in English pursuant to Article 21(2) of the Patent Cooperation Treaty, and which claims priority to Swedish Application No. 0300521-2 filed 28 Feb. 2003. Said applications are expressly incorporated herein by reference in their entireties.

FIELD OF THE INVENTION

The present invention relates to a coupling device for connecting a load carrier bar extending laterally across a vehicle roof to a roof rail that extends in the longitudinal direction of the vehicle. The coupling device has a base part which, when the coupling device is connected to the roof rail, is connected securely to the load carrier bar. The base part is provided with a contact surface positioned on the roof rail and a tightening arrangement is connected to the base part. The tightening arrangement has a tightening strap and a tightening means. The tightening strap encloses the roof rail and is tightened by the tightening means and thereby pressing a contact area of the contact surface against the roof rail and thus achieving secure connection between the coupling device and the roof rail.

BACKGROUND OF THE INVENTION

Coupling devices of the type described above are generally known; examples include those devices described in the German Registered Design G 82 29 446.1 and G 84 04 525.6, and in EP 0 606 852 and EP 1 022 192. However, a disadvantage of these earlier devices is that if the vehicle on which they are used is subjected to severe deceleration or, in the worst case, a collision, the coupling device may slide a significant distance along the roof rail and, in the worst case, may cause it to strike the connection point between the roof rail and the roof of the vehicle. Such an event usually exerts a severe force on the load attached to the load carrier bar causing it damage. In other cases, the load carrier bar may separate from the roof rail, causing damage to the load carrier and the roof rail, as well as to the load and, in the worst case, to other things impacted by the load carrier. In certain situations, the base part may also be tilted forward in the direction of travel of the vehicle causing the rear edge of the contact surface to lift which can result in severe point contact between the front edge of the contact surface and the roof rail potentially causing damage to the roof rail or causing the base part to twist about the rail which can cause even greater damage.

Therefore there exists a need for a coupling device of the type described in the introduction, and which does not slide a significant distance along the roof rail or twist about the rail in the event of severe deceleration.

SUMMARY OF THE INVENTION

The present invention provides a coupling device which overcomes the aforementioned disadvantages by means of a coupling device of the type introduced above. The device is characterized by the base part thereof being in the shape of a convex arch in the area to the front of the contact area of the contact surface with the roof rail, relative to the longitudinal direction of the vehicle, when the contact surface is tightened against the roof rail and the side of the arched shape that is facing the roof rail is made of a ductile material.

Preferably, the ductile material consists of a layer integral with the base part. In another aspect, the ductile material consists of a separate layer attached to the base part. In a further aspect, the ductile material also extends along the contact surface. In still a further aspect, the ductile material consists of an elastic material. Yet another aspect of the invention is that the base part, in the area to the rear of the contact surface, also possesses the characteristics exhibited by the base part in the area to the front of the contact surface.

BRIEF DESCRIPTION OF THE DRAWINGS

The present invention will hereinafter be described in terms of a preferred embodiment with reference to the accompanying drawings, in which:

FIG. 7 is a cross-sectional view corresponding to FIG. 6 in which the coupling device is shown tilted forward on the roof rail under severe deceleration.

DETAILED DESCRIPTION

Figure 1:
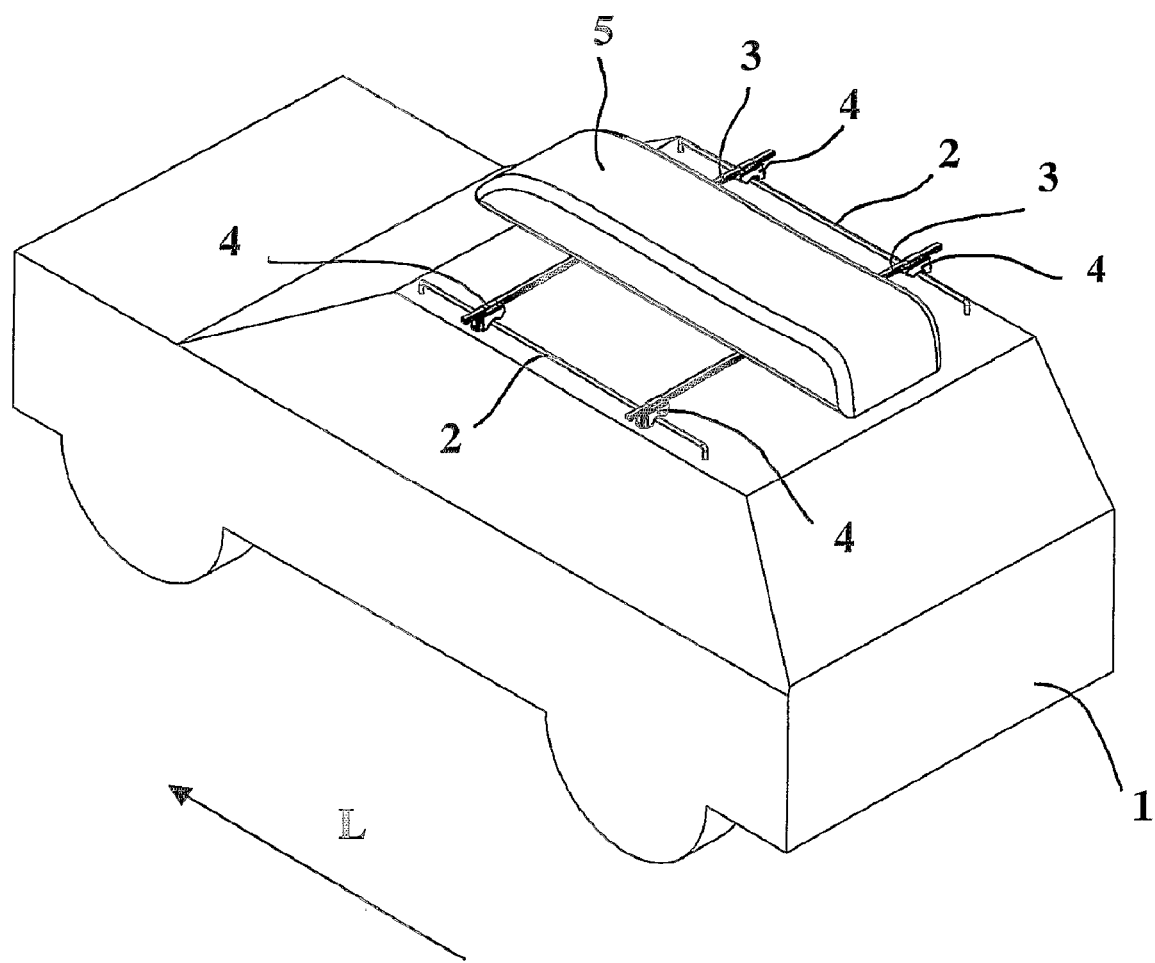
FIG. 1 is a perspective schematic view representing a vehicle with roof rails and an attached load carrier.

FIG. 1 is a schematic view of a vehicle 1 equipped with roof rails 2 extending in, and essentially parallel to the longitudinal direction, L, of the vehicle. Arranged between the roof rails are load carrier bars 3, connected respectively to the roof rails by means of attachment devices 4 in accordance with the teachings of the present invention. The load carrier bars carry the load 5 to be transported, which load is shown in FIG. 1 taking the form of a roof box, but which may obviously consist of another item of equipment suitable for transport on the load carriers.

Figure 2:
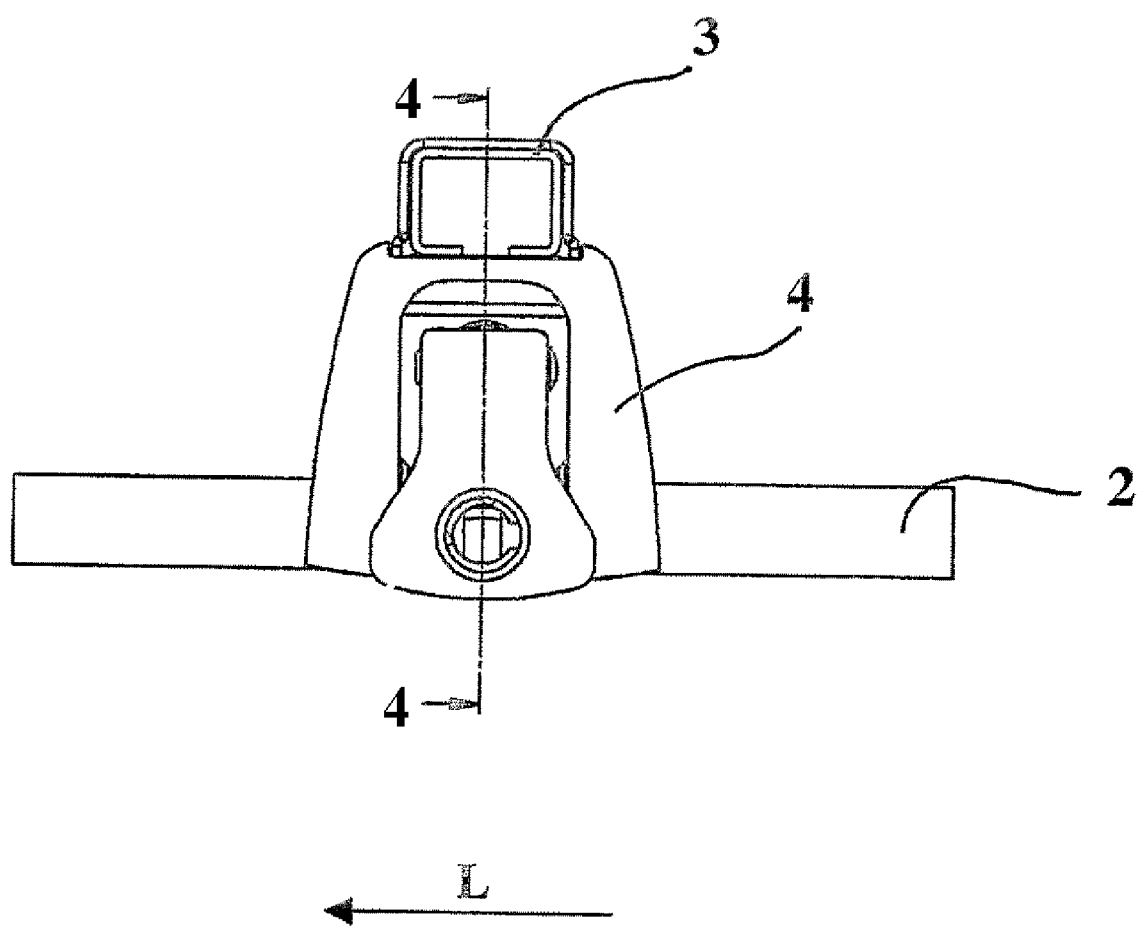
FIG. 2 is an elevational outboard-view-looking-inward view of an exemplary foot showing the coupling device connected to a roof rail.
Figure 3:
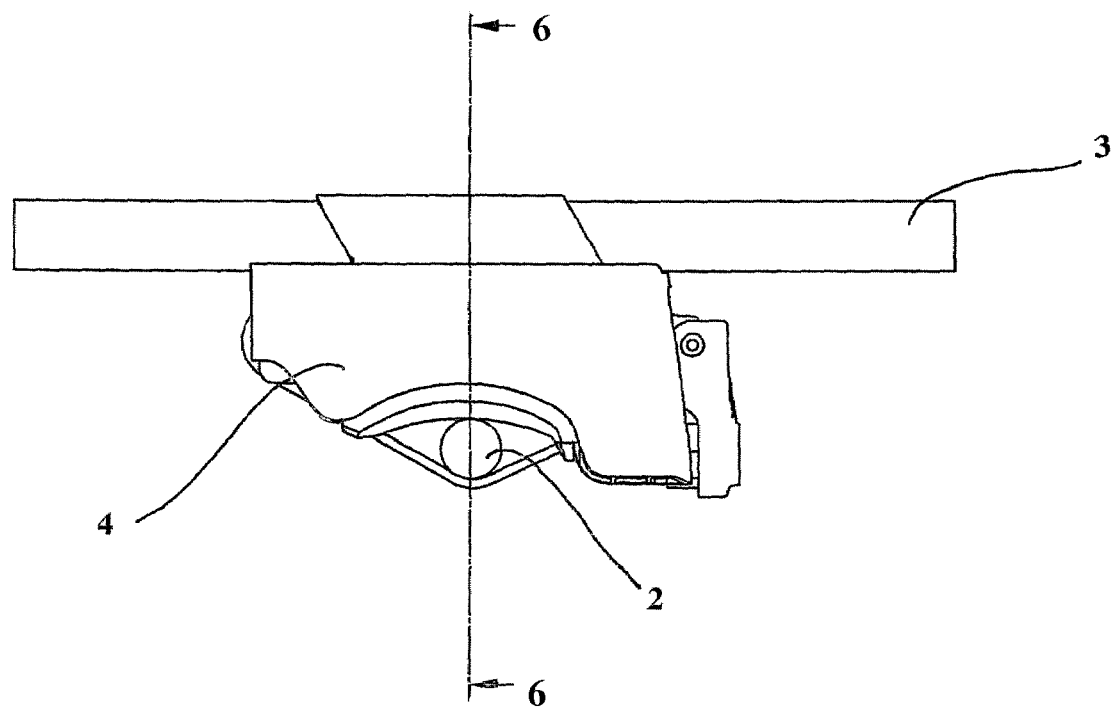
FIG. 3 is an elevational view showing the coupling device connected to a roof rail as seen in the longitudinal direction of the roof rail.

FIGS. 2 and 3 show an attachment device 4 (foot) in accordance with the present invention attached to a roof rail 2. In FIG. 2, the arrangement is shown from the side of the vehicle and the longitudinal direction of the vehicle is indicated by the arrow L, the front of the vehicle being to the left in FIG. 2; and in FIG. 3, the arrangement is shown from the front of the vehicle.

Figure 4:
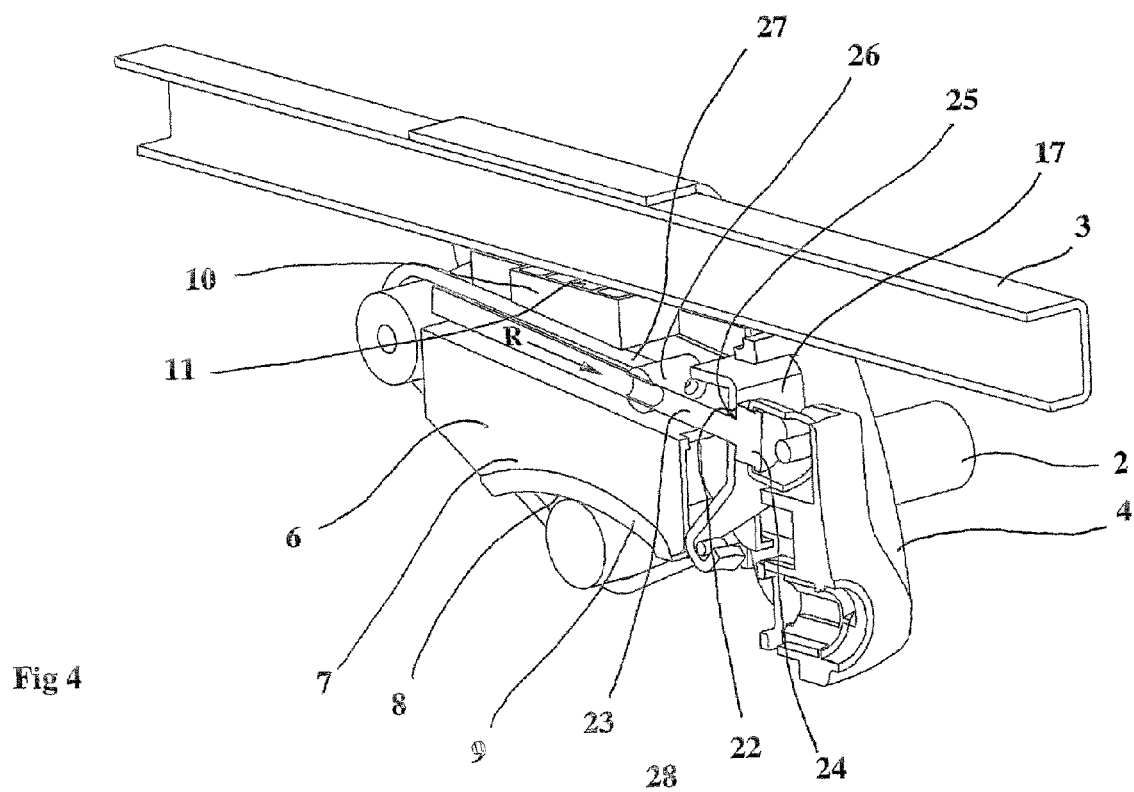
FIG. 4 is an isometric cutaway view taken through section 4-4 in FIG. 2.
Figure 5:
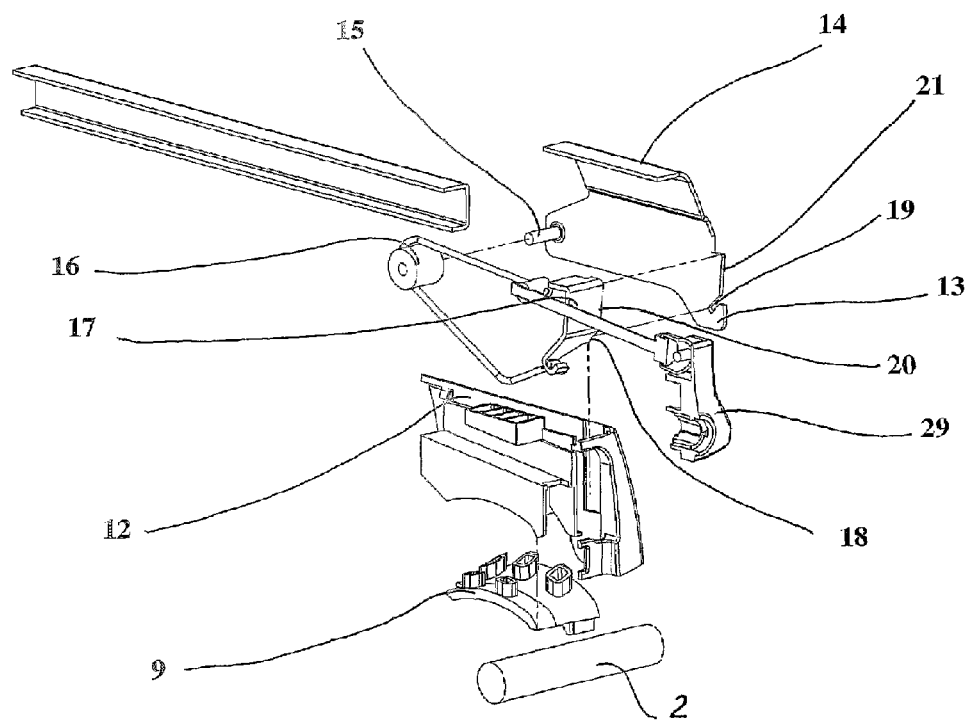
FIG. 5 is an isometric cutaway exploded view corresponding to FIG. 4.

The design of the attachment device 4 will hereinafter be described in further detail with reference to FIGS. 4 and 5. Although only one half of the attachment device is shown in FIGS. 4 and 5, it will be clear to those skilled in the art that the half which has been omitted is a mirror image of the half shown and that, as a result, the description below applies equally to the omitted half. The attachment device comprises (includes, but is not necessarily limited to) a base part 6 positioned on a roof rail 2. The lower section 7 of the base part 6 incorporates a contact surface 8 resting on the roof rail. The contact surface 8 is provided with a layer 9 which is ductile and may form an integral part of the base part or, as shown in FIG. 5, may consist of a spacer that is attached to the base part 6 by any number of appropriate methods which are familiar to those persons skilled in these arts. Furthermore, as will be clear from the following description, the layer 9 need not extend along the entire contact surface 8 in order for the device to function satisfactorily in accordance with the present invention.

The upper section 10 of the base part is provided with a support surface 11 on which the load carrier bar 3 bears. The base part is provided with a channel 12 in which one shank 13 of a bracket 14 is engaged, and which bracket encloses the load carrier bar 3. At the front end, the shanks 13 are connected by a spindle 15 on which a rotary pulley 16 is mounted. At the rear end, a plate 17 extends between the shanks 13. The plate 17 is provided with a tab 18, which engages in a notch 19 in the shank 13, and with an edge 20, which bears against an end 21 on the shank 13. The plate 17 is provided with a hole 22 in which a free-running tightening means 23 in the form of a tightening screw is fitted. The head 24 of the tightening means is provided with a shoulder 25, which bears against the plate 17.

The tightening means carries, in known manner, a threaded runner 26, to which a tightening strap 27 is attached, also in a known manner. The tightening strap runs around the pulley 16 and roof rail 2 and is connected to a hook on the plate 17. The head 24 is provided with a turning device 29 which enables the tightening screw to be rotated. A flow (transfer) of force is established through the tightening means 23, runner 26, tightening strap 27 and plate 17, and is exerted, through the spindle 15 and plate 17, at points on the bracket 14, and also on the roof rail 2 by virtue of the contact between the tightening strap and the rail. Turning the tightening screw in the tightening direction causes the runner 26 to move in the direction indicated by the arrow R in FIG. 4 and increases the magnitude of the force, causing the bracket 14 and roof rail 2 to be tightened towards each other by the increasing force, and causing the bracket to press the load carrier bar against the base part 6, whose contact surface 8 is, in turn, pressed against the roof rail 2, resulting in secure connection of the load carrier bar to the base part 6 while connecting the base part securely to the roof rail 2.

Figure 6:
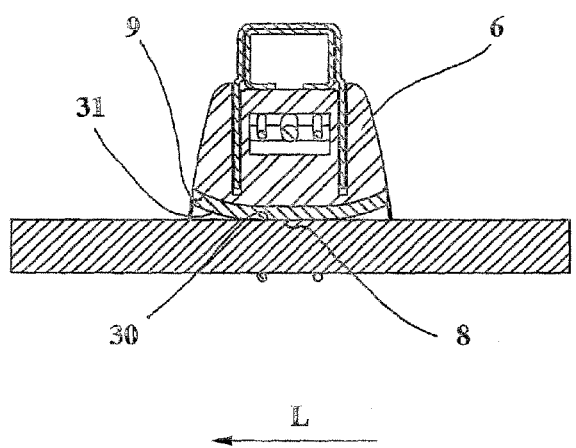
FIG. 6 is a cross-sectional view taken along 6-6 in FIG. 3.

As shown in FIG. 6, which is a section through 6-6 in FIG. 3, and in which the front end of the vehicle is to the left, the contact surface 8 of the base part 6 is provided with a contact area 30, which bears against the roof rail. The base part 6 and contact surface 8 to the front of the contact area 30 is of an arched shape 31. FIG. 6 also shows the layer 9, which may be of a ductile material, such as a non-rigid plastic, or an elastic material, such as rubber or another suitable polymeric material. The layer 9 may be integral with the base part or may be separate and attached to the base by the method known to those skilled in the art.

FIG. 7 is a view corresponding to FIG. 6. In this figure, however, the coupling device is subjected to the forces which occur when the vehicle is braked suddenly or is stopped in the manner typical of a collision. Since these forces act on the coupling device in the direction indicated by the arrow K, and since their point of action is located in the upper section of the base part, the base part tends to be rotated counterclockwise as indicated by the arrow M. As is clear from the figure, this causes the layer 9 to become deformed in the area of the arched shape 31, while the magnitude of the force flow also increases causing the contact force exerted by the base part 6 on the roof rail to increase, with the result that the coupling device 4 will be displaced by a smaller distance along the roof rail than would otherwise be the case in the event of sudden braking.

Although the figures show the layer 9 extending the length of the contact area 30, it is sufficient for the layer to extend over the convex arched shape 31 for the invention to function satisfactorily.

FIGS. 6 and 7 also show that the base part is provided with a convex arched shape 32 to the rear of the contact area 30, which shape is identical to the arched shape 30 to the front of the area. Because of this symmetry, it is immaterial whether a coupling device 4 is mounted on a right-hand or a left-hand roof rail for the attachment device to function in accordance with the present invention.

What is claimed is:

1. A coupling device (4) for connecting a load carrier bar (3) extending laterally across a vehicle roof to a roof rail (2), which rail extends in the longitudinal direction (L) of the vehicle, said coupling device comprising:
   a base part (6) which, when the coupling device is connected to the roof rail, is securely attached to the load carrier bar, said base part being provided with a contact surface (8) positioned on an upper surface of the roof rail, forming a contact area (30) between said contact surface (8) and the upper surface of the roof rail and a tightening arrangement (17, 23, 26, 27) connected to the base part and comprising a tightening strap (27) and a tightening means (23);
   said tightening strap enclosing the roof rail and being tightened by said tightening means so that the contact area (30) of the contact surface (8) is pressed against the upper surface of the roof rail thus achieving secure connection of the coupling device to the roof rail;
   said contact surface (8) of said base part (6) being of a convex arched shape (31) at a front portion of the contact area (30) such that the curve of the convex arched shape is along the length of the roof rail; and
   a surface of the arched shape facing the roof rail (2) is made of a ductile material.

2. The coupling device (4) as recited in claim 1, wherein the ductile material comprises a layer integral with the base part.

3. The coupling device (4) as recited in claim 1, wherein the ductile material comprises a separate layer (9) attached to the base part (6).

4. The coupling device (4) as recited in claim 1, wherein the ductile material extends across an entire length of the contact area (30).

5. The coupling device (4) as recited in claim 2, wherein the ductile material extends across an entire length of the contact area (30).

6. The coupling device (4) as recited in claim 3, wherein the ductile material extends across an entire length of the contact area (30).

7. The coupling device (4) as recited in claim 1, wherein the ductile material has as a component thereof an elastic material.

8. The coupling device (4) as recited in claim 2, wherein the ductile material has as a component thereof an elastic material.

9. The coupling device (4) as recited in claim 3, wherein the ductile material has as a component thereof an elastic material.

10. The coupling device (4) as recited in claim 4, wherein the ductile material has as a component thereof an elastic material.

11. The coupling device (4) as recited in claim 5, wherein the ductile material has as a component thereof an elastic material.

12. The coupling device (4) as recited in claim 6, wherein the ductile material has as a component thereof an elastic material.

13. The coupling device (4) as recited in claim 1, wherein the base part (6) is of a convex arched shape (32) in an area to the rear of the contact area (30) with the roof rail (2), such that the curve of the convex arched shape is along the length of the roof rail, when the contact surface (8) is tightened against the roof rail, and the side of the arched shape (32) facing the roof rail consists of a ductile material.

14. The coupling device (4) as recited in claim 1, wherein the base part (6) at a rear portion of the contact area (30) is of a convex arched shape (32) and a surface of the arched shape facing the roof rail (2) is made of a ductile material.

15. A coupling device (4) for connecting a load carrier bar (3) extending laterally across a vehicle roof to a roof rail (2), which rail extends in the longitudinal direction (L) of the vehicle, the coupling device comprising a base part (6) which, when the coupling device is connected to the roof rail, is securely attached to the load carrier bar, and which base part is provided with a contact surface (8) which is positioned on an upper surface of the roof rail, forming a contact area (30) between said contact surface (8) and the roof rail, as well as a tightening arrangement (17, 23, 26, 27) connected to the base part and comprising a tightening strap (27) and a tightening means (23), the tightening strap enclosing the roof rail and being tightened by means of the tightening means, whereby the contact area (30) on the contact surface (8) is pressed against the upper surface of the roof rail, thus achieving secure connection of the coupling device to the roof rail, the contact surface (8) of said base part (6) is of a convex arched shape (31) in the area to the front of the contact area (30), such that the curve of the convex arched shape is along the length of the roof rail, when the contact surface (8) is tightened against the roof rail, and that the side of the arched shape facing the roof rail (2) is made of a ductile material.

16. The coupling device (4) as recited in claim 15, wherein the ductile material consists of a layer integral with the base part.

17. The coupling device (4) as recited in claim 15, wherein the ductile material consists of a separate layer (9) attached to the base part (6).

18. The coupling device (4) as recited in claim 15, wherein the ductile material also extends the length of the contact area (30).

19. The coupling device (4) as recited in claim 15, wherein the ductile material consists of an elastic material.

20. The coupling device (4) as recited in claim 15, wherein the base part (6) is of a convex arched shape (32) in the area to the rear of the contact area (30) with the roof rail (2), relative to the longitudinal direction of the vehicle, when the contact surface (8) is tightened against the roof rail, and that the side of the arched shape (32) facing the roof rail consists of a ductile material.

* * * * *